(12) United States Patent
Cardana

(10) Patent No.: US 7,841,654 B1
(45) Date of Patent: Nov. 30, 2010

(54) UNIVERSAL EXERCISE BICYCLE SEAT ADAPTER DEVICE

(76) Inventor: Robert Cardana, P.O. Box 305, Rexford, MT (US) 59930

( * ) Notice: Subject to any disclaimer, the term of this patent is extended or adjusted under 35 U.S.C. 154(b) by 180 days.

(21) Appl. No.: 12/287,660

(22) Filed: Oct. 10, 2008

Related U.S. Application Data

(60) Provisional application No. 60/999,296, filed on Oct. 16, 2007.

(51) Int. Cl.
  *B62J 1/02*  (2006.01)
(52) U.S. Cl. ................ 297/195.1; 297/130; 297/195.11
(58) Field of Classification Search ................ 297/130, 297/195.1, 195.11, 215.13, 215.14; 248/300
  See application file for complete search history.

(56) References Cited

U.S. PATENT DOCUMENTS 4,456,295 A * 6/1984 Francu ........................ 297/211
4,772,069 A * 9/1988 Szymski ................. 297/215.14
4,877,286 A * 10/1989 Hobson et al. .......... 297/215.13
4,915,538 A * 4/1990 Golden et al. ........... 297/215.15
5,529,326 A * 6/1996 Hwang ..................... 297/195.1
6,752,453 B1 * 6/2004 Yapp ...................... 297/215.14
7,311,362 B2 * 12/2007 Gaffney .................... 297/195.1
7,494,181 B2 * 2/2009 Tucker ........................ 297/201

\* cited by examiner

*Primary Examiner*—Peter R. Brown
(74) *Attorney, Agent, or Firm*—Emery L. Tracy

(57) ABSTRACT

A universal exercise bicycle seat adapter device for use with an after market bicycle seat and an exercise bicycle is provided. The bicycle seat has a tightenable mounting bracket and the exercise bicycle has a mounting plate secured to a seat post with the mounting plate having a plurality of apertures formed therein. The adapter device comprises a base plate and a stem extending from the base plate and receivable and releasably securable within the mounting bracket. A plurality of slots are formed in the base plate with at least one of the slots alignable with at least one of the apertures formed in the mounting plate. A fastening mechanism is insertable through the aligned apertures and slots for releasably securing the base plate to the mounting bracket.

20 Claims, 4 Drawing Sheets

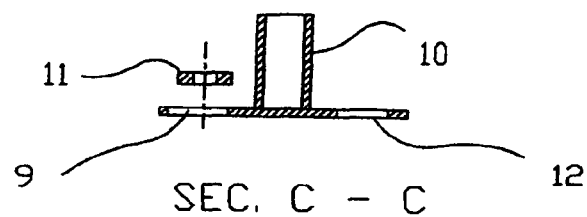
SEC. C - C
FIG. 2A
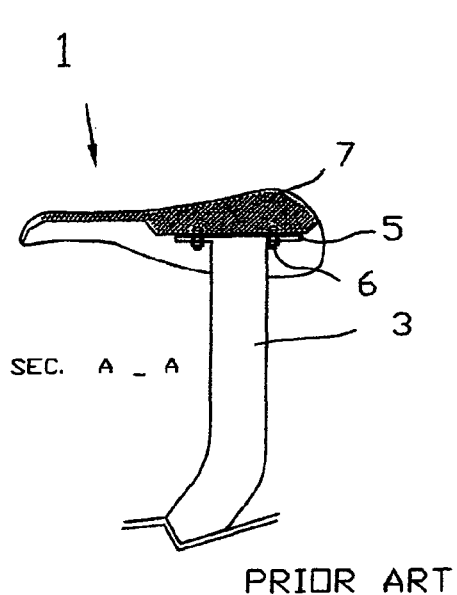
PRIOR ART
FIG. 3
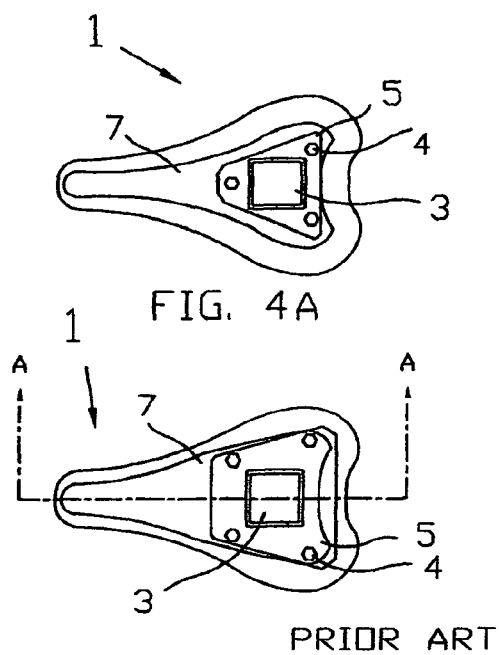
FIG. 4A
PRIOR ART
FIG. 4
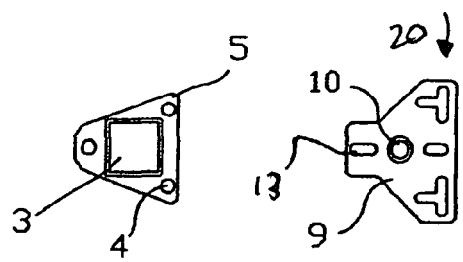
FIG. 5    FIG. 6
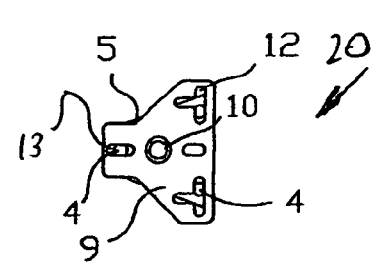
FIG. 6A

SEC. B _ B

US 7,841,654 B1

UNIVERSAL EXERCISE BICYCLE SEAT ADAPTER DEVICE

The present application claims benefit of priority of provisional patent application Ser. No. 60/999,296, filed on Oct. 16, 2007, entitled "Universal Exercise Bicycle Seat Adaptor".

BACKGROUND OF THE INVENTION

1. Field of the Invention

This invention relates generally to a universal exercise bicycle seat adapter device and, more particularly, the invention relates to a universal exercise bicycle seat adapter device for adapting a variety of conventional bicycle saddles to exercise equipment and other devices.

2. Description of the Prior Art

In exercise bicycle and spinning equipment of the know art know art, there only exist fixed seat mounting accommodations which restrict the use of any other types of seat. Because of the variations in human anatomy and with the advent of well designed, healthy, and recommended new bicycle saddle designs, the need for a universal exercise bicycle seat adapter device has prompted the present invention.

Accordingly, there exists a need for a universal exercise bicycle seat adapter device that will overcome the deficiencies of conventional bicycle seats. Additionally, a need exists for a universal exercise bicycle seat adapter device that adapts a variety of conventional bicycle saddles to exercise equipment and other devices. Furthermore, there exists a need for a universal exercise bicycle seat adapter device having a base plate with formed bores and slots mateable with formed bores and slots of the mounting plate of the device to which it is affixed. Further yet, a need exists for a universal exercise bicycle seat adapter device having a stem for accommodating a clamp which fixes the universal exercise bicycle seat adapter device to a bicycle saddle of infinite variety. Further still, there exists a need for a universal exercise bicycle seat adapter device having an extension plate provided with bores and slots and slidably arranged to accommodate additional bore and slots of adjacent bores and slots in the mounting plate portion of another device.

SUMMARY

The present invention is a universal exercise bicycle seat adapter device for use with an after market bicycle seat and an exercise bicycle. The bicycle seat has a tightenable mounting bracket and the exercise bicycle has a mounting plate secured to a seat post with the mounting plate having a plurality of apertures formed therein. The adapter device comprises a base plate and a stem extending from the base plate and receivable and releasably securable within the mounting bracket. A plurality of slots are formed in the base plate with at least one of the slots alignable with at least one of the apertures formed in the mounting plate. A fastening mechanism is insertable through the aligned apertures and slots for releasably securing the base plate to the mounting bracket.

In addition, the present invention includes a method for using an after market bicycle seat with an exercise bicycle. The bicycle seat has a tightenable mounting bracket and the exercise bicycle has a mounting plate secured to a seat post with the mounting plate having a plurality of apertures formed therein. The method comprises providing a base plate, extending a stem from the base plate, forming a plurality of slots in the base plate, aligning at least one of the apertures with at least one of the slots, releasably securing the base plate to the mounting bracket through the aligned aperture and slot, inserting the stem into the mounting bracket, and tightening the mounting bracket about the stem.

The present invention further includes a universal exercise bicycle seat adapter device for use with an after market bicycle seat and an exercise bicycle. The bicycle seat has a tightenable mounting bracket and the exercise bicycle has a mounting plate secured to a seat post with the mounting plate having a plurality of apertures formed therein. The adapter device comprises a base plate, a pair of T-shaped slots formed in the base plate, and a pair of elongated slots formed in the base plate. A stem extends from the base plate and is receivable within the mounting bracket with the stem centered between the elongated slots. At least one of the T-shaped slots or elongated slots is alignable with at least one of the apertures formed in the mounting plate. Fastening means releasably secure the base plate to the mounting bracket.

BRIEF DESCRIPTION OF THE DRAWINGS

FIG. 2A is a sectional view illustrating the universal exercise bicycle seat adapter device, constructed in accordance with the present invention;

FIG. 3 is a sectional view taken along the line A-A of FIG. 4 illustrating a conventional seat and post of a conventional exercise device;

FIG. 4A is a bottom view illustrating a conventional seat from a conventional exercise device;

FIG. 4 is a bottom view illustrating a conventional exercise device seat;

FIG. 5 is a bottom view illustrating an embodiment of a mounting plate of a conventional exercise device;

FIG. 6 is a top view illustrating a base plate of the universal exercise bicycle seat adapter device, constructed in accordance with the present invention;

FIG. 6A is a top view illustrating the base plate of the universal exercise bicycle seat adapter device, constructed in accordance with the present invention, as superimposed over the mounting plate of a conventional exercise device;

DETAILED DESCRIPTION OF THE PREFERRED EMBODIMENTS

Figure 1:
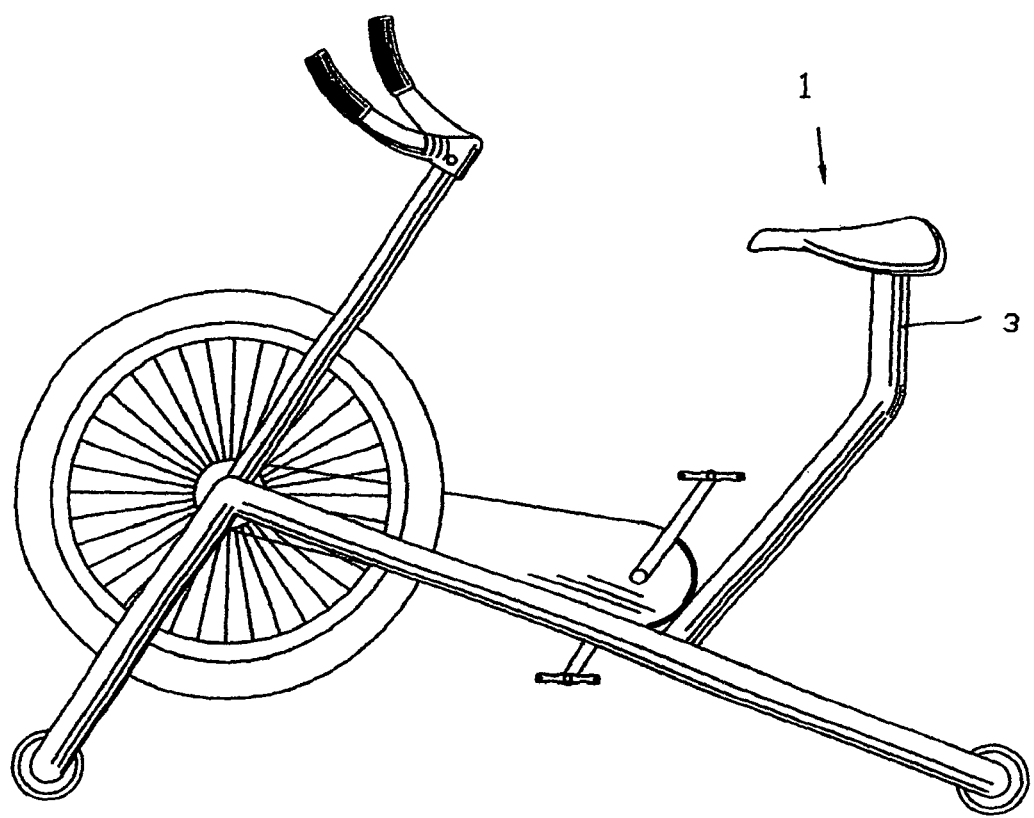
FIG. 1 is a perspective view illustrating a conventional exercise device.
Figure 2:
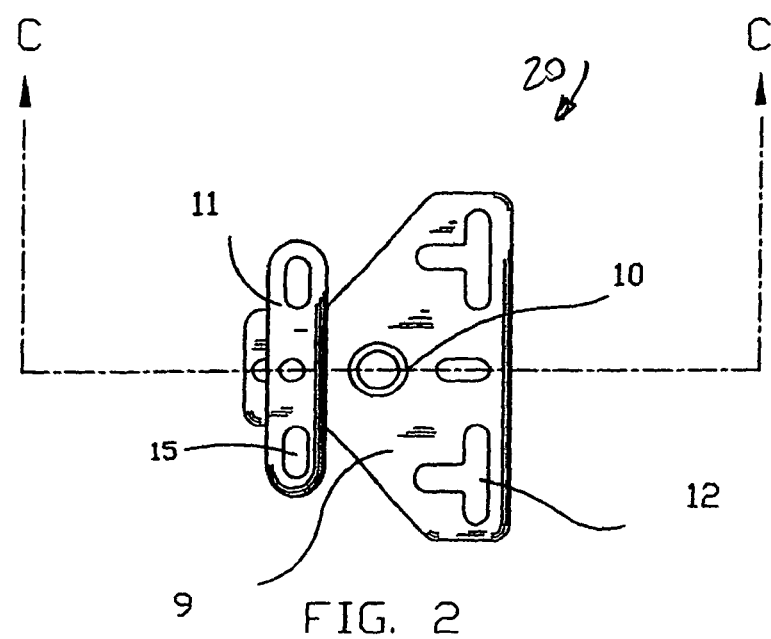
FIG. 2 is a top view illustrating a universal exercise bicycle seat adapter device, constructed in accordance with the present invention.

FIG. 1 illustrates a conventional exercise device with a conventional seat 1 presently accompanying the conventional exercise device and a seat post 3 for mounting the conventional seat 1 thereon. As illustrated in FIGS. 2 and 2A, the present invention is a universal exercise bicycle seat adapter device, indicated generally at 20, for adapting a variety of conventional bicycle saddles to exercise equipment and other devices. The adapter device 20 of the present invention allows a user to select his or her own bicycle saddle and adapt the bicycle saddle on an existing exercise equipment.

The adapter device 20 of the present invention has a base plate 9. Preferably, the base plate 8 is a flat, substantially planar plate having a stem 10, a pair of T-shaped slots 12, a pair of elongated slots 13, and a detachable extension plate 11. Preferably, the stem 10 is tubular and extends from the base plate 9 in a substantial center of the base plate 9 between the T-shaped slots 12 and centered between the elongated slots 13. The extension plate 11 further includes a pair of elongated slots 15 and a circular bore 16. Use of the adapter device 20 with a conventional bicycle saddle will be described in further detail below.

FIG. 3 is a sectional view illustrating of a typical conventional exercise bicycle seat, a seat post 3, and a mounting plate 5 with a substrate 7 and fasteners 6 for securing the seat to the mounting plate 5. FIG. 4A is a bottom view illustrating a typical seat 1, substrate 7, the seat post 3, the mounting plate 5, and bores 4 and is shown here as a comparison to the relative components and features of FIG. 4.

FIG. 4 illustrates a typical variation of a bicycle seat while FIG. 4A illustrates another embodiment of conventional seats and mounting base of seats of the prior art. FIG. 5 illustrates one version of a typical seat post and mounting base 5 as compared with the same view of a different version of the same in FIG. 7. FIG. 6 is a top view illustrating the seat adapter 9 with the stem 10, the T-shaped slots 12, and the elongated slots 13 without use of extension plate 11. FIG. 6A illustrates the superimposition of the base plate 9 of the seat adapter 10 and the alignment of the bores 4 of the mounting plate 5 with the T-shaped slots 12 and the elongated slots 13 of the adapter device 20. A fastening mechanism, such as bolts and nuts 6, secure the adapter device 20 to the mounting plate 5 through the selective use of the T-shaped slots 12 and the elongated slots 13.

Figures 7, 8, 9:
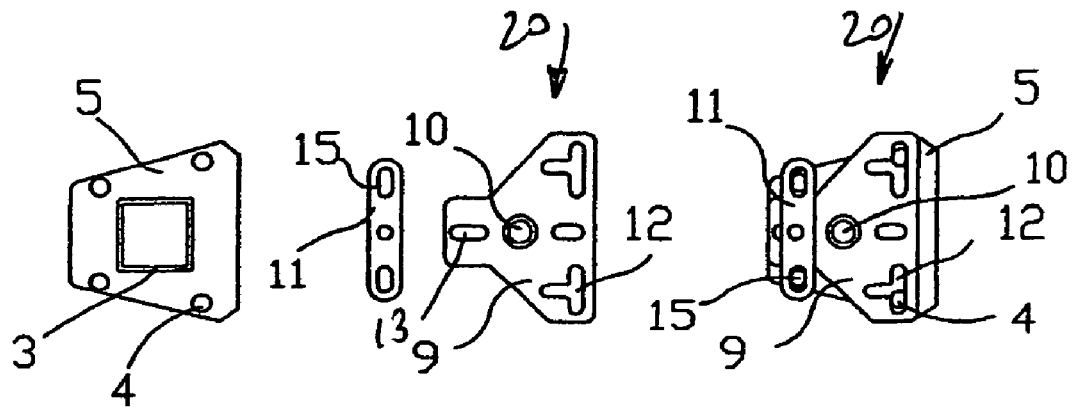
FIG. 7 is a bottom view illustrating an embodiment of the mounting plate of a conventional exercise device.
FIG. 8 is a top view illustrating the universal exercise bicycle seat adapter, constructed in accordance with the present invention.
FIG. 9 is a top view of the universal exercise bicycle seat adapter device, constructed in accordance with the present invention, superimposed over a mounting plate of a typical exercise device.

FIGS. 7, 8, and 9 illustrate how the extension plate 11 of the adapter device 20 is incorporated to provide a universal adaptation when combined with the mounting base 9 in FIGS. 6, 7 and 9. The extension plate 11 is releasably secured to one of the elongated slots 13 on the base plate 8 with a bolt and nut combination, for example. The adapter plate 20 is then releasably sequred to the mounting plate 5, as described above, with the stem 5 extending in a generally upward direction.

Figure 10:
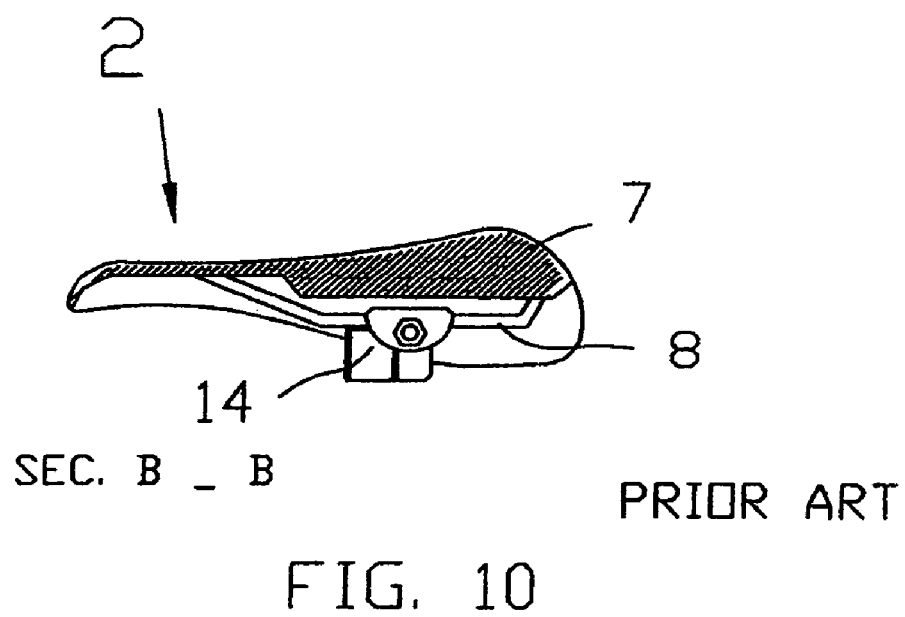
FIG. 10 is a side sectional view illustrating a conventional bicycle seat with a mounting bracket in place about the rails.
Figure 11:
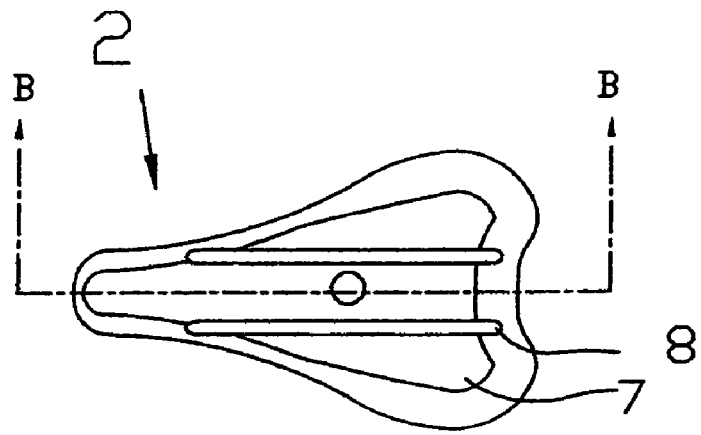
FIG. 11 is a bottom view illustrating a conventional bicycle with the rails.

FIG. 10 is a side sectional view taken along the line B-B of FIG. 11 of a typical after market seat 2 of the prior art with a tightenable mounting bracket 14 placed about the rails 8 which are anchored in substrate 7. FIG. 11 is a bottom view of a 2, after market seat of the prior art better illustrating rails 8 as disposed within substrate 7.

Figure 12:
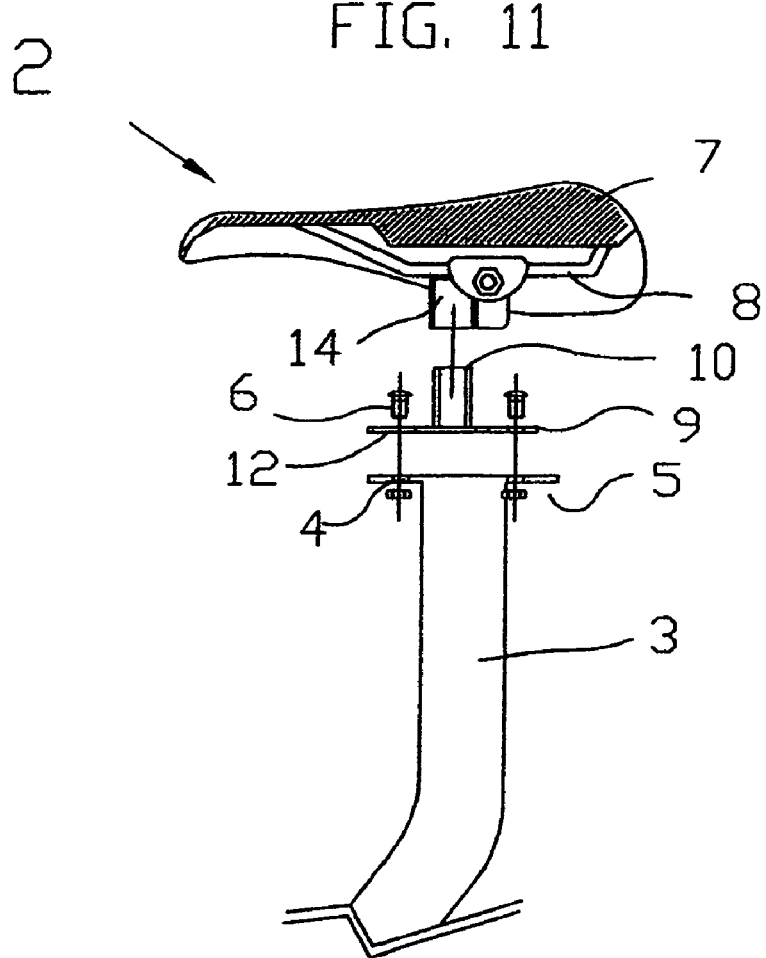
FIG. 12 is a side view illustrating a seat post of a conventional exercise device with a conventional bicycle seat and a universal exercise bicycle seat adapter device, constructed in accordance with the present invention.

FIG. 12 illustrates the assembly of the components of the after market seat 2, rails 8, the mounting bracket 14 over the stem 8 as supported by the mounting base 9 of the seat adapter 20 as it aligns with fasteners 6 through bores and slots 4 and 12 on typical seat post 3 of the prior art.

It will also be understood that, in addition to a seat adapter 20 for an exercise device, the seat adapter 20 can also be used as a fishing rod holder, a tractor umbrella bracket, a table leg support, or a lathe faceplate fixture.

The foregoing exemplary descriptions and the illustrative preferred embodiments of the present invention have been explained in the drawings and described in detail, with varying modifications and alternative embodiments being taught.

While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A universal exercise bicycle seat adapter device which is used with an after market bicycle seat and an exercise bicycle, the bicycle seat having a tightenable mounting bracket, the exercise bicycle having a mounting plate secured to a seat post, the mounting plate having a plurality of apertures formed therein, the adapter device comprising:
   a base plate;
   a stem extending from the base plate and receivable and releasably securable within the mounting bracket;
   a plurality of slots formed in the base plate, at least one of the slots alignable with at least one of the apertures formed in the mounting plate; and
   fastening means insertable through the aligned apertures and slots for releasably securing the base plate to the mounting bracket;
   wherein the plurality of slots includes a pair of T-shaped slots for allowing securement of the base plate to a range of mounting plates having variously spaced apertures.

2. The adapter device of claim 1 wherein the base plate is a flat, substantially planar plate.

3. The adapter device of claim 1 wherein the plurality of slots includes a pair of elongated slots formed in the base plate.

4. The adapter device of claim 1 wherein the stem is tubular and extends from the base plate in a substantial center of the base plate, the stem centered between the plurality of slots.

5. The adapter device of claim 1 and further comprising:
   an extension plate;
   a plurality of extension plate apertures formed in the extension plate; and
   wherein upon alignment of at least one of the extension plate apertures with at least one of the slots, the extension plate is releasably securable to the base plate through one of the apertures; and
   wherein the combined base plate and extension plate is securable to the mounting plate.

6. The adapter device of claim 5 wherein the plurality of apertures includes a pair of elongated slots and a circular bore.

7. A method for using an after market bicycle seat with an exercise bicycle, the bicycle seat having a tightenable mounting bracket, the exercise bicycle having a mounting plate secured to a seat post, the mounting plate having a plurality of apertures formed therein, the method comprising:
   providing a base plate;
   extending a stem from the base plate;
   forming a plurality of slots in the base plate;
   aligning at least one of the apertures with at least one of the slots;
   releasably securing the base plate to the mounting bracket through the aligned aperture and slot;
   inserting the stem into the mounting bracket;
   tightening the mounting bracket about the stem; and
   forming the plurality of slots as a pair of T-shaped slots for allowing securement of the base plate to a range of mounting plates having variously spaced apertures.

8. The method of claim 7 and further comprising:
constructing the base plate as a flat, substantially planar plate.

9. The method of claim 7 and further comprising:
forming the plurality of slots as a pair of elongated slots.

10. The method of claim 7 wherein the stem is tubular and further comprising:
extending the stem from the base plate in a substantial center of the base plate centered between the slots.

11. The method of claim 7 and further comprising:
providing an extension plate;
forming a plurality of extension plate apertures in the extension plate;
aligning at least one of the extension plate apertures with at least one of the slots;
releasably securing the extension plate to the base plate through the aligned apertures and slots; and
securing the combined base plate and extension plate to the mounting plate.

12. The method of claim 11 and further comprising:
forming the plurality of apertures as a pair of elongated slots and a circular bore.

13. A universal exercise bicycle seat adapter device which is used with an after market bicycle seat and an exercise bicycle, the bicycle seat having a tightenable mounting bracket, the exercise bicycle having a mounting plate secured to a seat post, the mounting plate having a plurality of apertures formed therein, the adapter device comprising:
a base plate;
a pair of T-shaped slots formed in the base plate for allowing securement of the base plate to a range of mounting plates having variously spaced apertures;
a pair of elongated slots formed in the base plate;
a stem extending from the base plate and receivable within the mounting bracket, the stem centered between the elongated slots;
at least one of the T-shaped slots or elongated slots alignable with at least one of the apertures formed in the mounting plate; and
fastening means for releasably securing the base plate to the mounting bracket.

14. The adapter device of claim 13 wherein the base plate is a flat, substantially planar plate.

15. The adapter device of claim 13 wherein one of the elongated slots is centered between the pair of T-shaped slots.

16. The adapter device of claim 13 wherein the stem is tubular and extends from the base plate in a substantial center of the base plate.

17. The adapter device of claim 13 and further comprising:
an extension plate; and
a plurality of apertures formed in the extension plate;
wherein upon alignment of at least one of the extension plate apertures with at least one of the slots, the extension plate is releasably securable to the base plate through one of the apertures; and
wherein the combined base plate and extension plate is securable to the mounting plate.

18. The adapter device of claim 17 wherein the plurality of apertures includes a pair of elongated slots and a circular bore.

19. A universal exercise bicycle seat adapter device which is used with an after market bicycle seat and an exercise bicycle, the bicycle seat having a tightenable mounting bracket, the exercise bicycle having a mounting plate secured to a seat post, the mounting plate having a plurality of apertures formed therein, the adapter device comprising:
a base plate;
a stem extending from the base plate and receivable and releasably securable within the mounting bracket;
a plurality of slots formed in the base plate, at least one of the slots alignable with at least one of the apertures formed in the mounting plate;
fastening means insertable through the aligned apertures and slots for releasably securing the base plate to the mounting bracket;
an extension plate;
a plurality of extension plate apertures formed in the extension plate; and
wherein upon alignment of at least one of the extension plate apertures with at least one of the slots, the extension plate is releasably securable to the base plate through one of the apertures; and
wherein the combined base plate and extension plate is securable to the mounting plate.

20. The adapter device of claim 19 wherein the plurality of apertures includes a pair of elongated slots and a circular bore.

* * * * *